United States Patent [19]
Marzolf

[11] 3,891,598
[45] June 24, 1975

[54] BUBBLE-FREE, HIGH BARRIER VINYLIDENE CHLORIDE POLYMER FILMS AND PROCESS OF PREPARATION

[75] Inventor: Richard T. Marzolf, Midland, Mich.

[73] Assignee: The Dow Chemical Company, Midland, Mich.

[22] Filed: Feb. 11, 1974

[21] Appl. No.: 441,541

Related U.S. Application Data

[63] Continuation of Ser. No. 323,315, Jan. 12, 1973, abandoned.

[52] U.S. Cl.......... 260/42.56; 260/31.8 M; 260/42; 260/45.75 R; 260/95 R; 260/96 R
[51] Int. Cl. ... C08f 37/02; C08f 45/04; C08f 45/56
[58] Field of Search............ 260/42.56, 45.75 R, 42, 260/95 R, 96 R, 31.8 M

[56] References Cited
UNITED STATES PATENTS

| | | | |
|---|---|---|---|
| 2,013,941 | 9/1935 | Young et al. | 23/250 |
| 2,604,458 | 7/1952 | Havens | 260/45.7 |
| 3,261,793 | 7/1966 | Stevenson | 260/23.7 |

FOREIGN PATENTS OR APPLICATIONS

| | | |
|---|---|---|
| 739,411 | 10/1955 | United Kingdom |
| 811,532 | 4/1959 | United Kingdom |

OTHER PUBLICATIONS

Chevassus et al., *The Stabilization of Polyvinyl Chloride*, (Arnold Ltd. 1963), pp. 35–49, [TP 986 V 48 C45E].

Penn, *PVC Technology*, 3rd Ed. (Applied Science Ltd. 1967), pp. 265–280, [TP 1180 V 48 P 4].

*Primary Examiner*—Morris Liebman
*Assistant Examiner*—T. DeBenedictis, Sr.
*Attorney, Agent, or Firm*—Ronald G. Brookens

[57] ABSTRACT

This invention is directed to improved bubble-free, high barrier film materials prepared from substantially plasticizer-free vinylidene chloride polymer compositions containing small amounts of magnesium oxide; and to a process for the preparation of such improved films.

3 Claims, No Drawings

3,891,598

BUBBLE-FREE, HIGH BARRIER VINYLIDENE CHLORIDE POLYMER FILMS AND PROCESS OF PREPARATION

CROSS-REFERENCE TO RELATED APPLICATION

This is a continuation of application Ser. No. 323,315, filed Jan. 12, 1973, and now abandoned.

BACKGROUND OF THE INVENTION

Polymers and copolymers of vinylidene chloride with such comonomers as acrylonitrile, vinyl chloride and lower alkyl acrylates have found wide use in the manufacture of filaments, sheets, tubes, films and extruded and molded shapes. It is known that such polymers are difficult to work with due to their brittleness, relatively poor flowing qualities and susceptibility to thermal degradation, as evidenced by the development of discoloration and the presence of gas bubbles during the fabrication thereof, and particularly during the thermal extrusion of film materials therefrom. It has, heretofore, been common practice to incorporate conventional plasticizers into vinylidene chloride polymer compositions to improve their workability. Thus, citric acid esters (see British Pat. No. 739,411), sebacic acid esters (see U.S. Pat. No. 2,604,458) and/or phthalate esters (see British Pat. No. 811,532) have been utilized in combination with vinylidene chloride polymers to produce film materials. Polymer compositions containing such plasticizers in conjunction with various stabilizer systems, e.g., combinations of an epoxidized soybean oil and an oxide of the metals of Group II of the periodic table, such as magnesium oxide, have also been used as disclosed, e.g., in U.S. Pat. No. 3,261,793.

It is known that these plasticized vinylidene chloride polymer compositions are less than wholly satisfactory for a number of reasons, e.g., most of the known plasticizers have poor compatibility with vinylidene chloride polymer compositions and migrate to the surface of articles, such as films, produced therefrom. This result is especially disadvantageous wherein the polymeric film material is used in food wrapping applications. Further, the presence of such plasticizers often significantly reduces the tensile strength and tends to increase the gas permeability of polymeric films produced from the vinylidene chloride polymers and particularly the permeability to water vapor and air. Further, films produced from the normally crystalline vinylidene chloride polymers containing the conventional plasticizers are often characterized by the presence of gas bubbles which are detrimental where clear, continuous film materials are required.

It is, therefore, the primary object of the present invention to produce vinylidene chloride polymer film materials characterized by impermeability to gases such as water vapor and air and which, in addition, can be thermally fabricated, e.g., extruded into film form, in the substantial absence of discoloration and the formation of bubbles.

SUMMARY OF THE INVENTION

The above and related objects are attained by preparation of substantially plasticizer-free extruded film material having an oxygen transmission rate of less than about 0.20 cc. of oxygen per 100 square inches per mil of vinylidene chloride polymer layer per 24 hours per atmosphere at 25°C. as determined by ASTM Test No. D 1434–66, said film material being comprised essentially of a blend of (1) a normally crystalline vinylidene chloride polymer containing from about 70 to 95 percent by weight of vinylidene chloride interpolymerized with from about 30 to about 5 percent by weight of at least one monoethylenically unsaturated monomer copolymerizable with vinylidene chloride, and (2) from about 0.05 to about 5 percent based on polymer weight, of magnesium oxide.

The invention further contemplates a process for preparing such film materials comprising: admixing the magnesium oxide in dry, powdered form with dry, powdered vinylidene chloride polymer; then removing any agglomerates from the admixture having a diameter in excess of about 500 microns, e.g., by passing such admixture through a screen of appropriate mesh; followed by fabricating the admixture into film form.

DESCRIPTION OF THE PREFERRED EMBODIMENTS

The normally crystalline vinylidene chloride polymers usable in this invention are well known and may be prepared by interpolymerizing vinylidene chloride with known comonomers. Typical of the normally crystalline polymeric materials falling within the advantageous definition are the polymers and copolymers of at least 70% by weight of vinylidene chloride, and preferably those containing from about 70 to about 95 percent by weight vinylidene chloride, with the remainder being composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Known ternary compositions also may be employed advantageously. Representative of such polymers are those composed of at least 70% by weight of vinylidene chloride with the remainder made of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known.

The magnesium oxide contemplated by the present invention may have an average particle size up to and including 10 microns or even greater. For obtaining optimum clarity in film structures prepared from such blends, however, it is preferred to utilize such oxide having an average particle size of less than about 0.5 micron.

As discussed supra, the preferred process for blending the normally crystalline vinylidene chloride polymer with the magnesium oxide described herein comprises admixing such oxide in dry powder form, with dry, powdered vinylidene chloride polymer. This may be readily accomplished by feeding the magnesium oxide powder to the dry polymer while such polymer is in motion, as in a conventional ribbon or cone blender, wherein the magnesium oxide is transported from a suitable container by means of a flexible tube to a position under the surface of the vinylidene chloride polymer. It is further required that any agglomerates having a diameter in excess of about 500 microns be removed from such blend prior to thermal extrusion of the blend into film form. This may be readily accomplished by passing the blend through a screen of appropriate mesh.

The presence of such magnesium oxide in the vinylidene chloride polymer prevents bubble formation in the film without significant increase in the oxygen or water transmission rates of such film. Further, the presence of the magnesium oxide permits utilization of significantly higher extrusion temperatures as is otherwise possible which, in turn, permits the utilization of vinylidene chloride polymers having a wide range of molecular weights in combination with high extrusion rates. Thus, for a given formulation, addition of magnesium oxide, in the prescribed amounts, increases the extrusion rate of the vinylidene chloride polymer formulation per screw RPM of the extruder utilized.

It may further be desired to formulate the blends contemplated herein with conventional modifying materials to provide added strength and/or flexibility. Exemplary of preferred such materials are the ethylenevinyl alkanoate copolymers as disclosed in U.S. Pat. No. 3,322,862 containing (1) from about 25 to 85 percent by weight ethylene and (2) complementarily from about 15 to 75 percent by weight of a vinyl alkanoate, the acid portion of such vinyl alkanoate containing from 2 to 8 carbon atoms. Included within such definition of vinyl alkanoates are vinyl acetate, vinyl propionate, vinyl butyrate, vinyl 2-ethyl hexoate and mixtures thereof. Other polymeric modifiers may also be used if desired, including the hydroxylated ethylene polymers as disclosed in the U.S. Pat. No. 3,631,226; copolymers of vinyl chloride and vinyl alkanoates as disclosed in U.S. Pat. No. 3,565,975; copolymers of a conjugated diolefin and lower alkyl acrylates and methacrylates or alkenyl ketones and the like, as disclosed in U.S. Pat. Nos. 3,166,526; 3,165,491; and 3,194,778. When adding such materials, it is preferable to admix them with the blend of vinylidene chloride polymer and magnesium oxide, preferably after such material has been screened to remove any of the before mentioned agglomerates. In this regard, it is preferred to admix the vinylidene chloride polymer-magnesium oxide blend with the polymeric modifier in the extruder used to form such mixtures into polymeric film.

The above-described blends may be extruded, using conventional equipment, into single or multi-ply, oriented or unoriented film structures. Exemplary of highly useful multi-ply film structures are those as disclosed in U.S. Pat. No. 3,549,389. Such blends may also be used for preparation of oriented film structures by utilization of the bubble technique for making films in tubular form.

The compositions disclosed by the present invention are useful in other processes, such as molding, slot extrusion and other thermal fabrication techniques to form films, fibers, foils, molded articles and other forms having the superior properties.

The invention will be illustrated with the following nonlimiting examples wherein all percentages and parts are by weight.

EXAMPLE 1

A crystalline copolymer composed of about 85 percent by weight vinylidene chloride and about 15 percent by weight vinyl chloride was prepared by emulsion polymerization utilizing potassium persulfate as the catalyst and the dihexyl ester of the sodium salt of sulfosuccinic acid as the emulsifier in a manner well known in the art. To the vinylidene chloride copolymer was then added as an impact modifier, 3 percent by weight of a copolymer of ethylene and vinyl acetate (Elvax 150). Separate portions of the crystalline polymer composition were individually extruded using a 3 ½ inch extruder having a length to diameter ratio of 20 to 1, and utilizing a blown film die and conventional quench bath to make a polymeric tape material. The resulting tape was evaluated for the presence of bubbles, color and surface characteristics and was weighed to determine the extrusion rate. In each instance, the tape was characterized by the presence of a large amount of bubbles therein.

Assuming that such bubbles comprised entrained air, a series of extrusion runs was then made wherein the screw was removed after each run so that the "heel" (the plastic on the extruder screw hardened by a fast cooling of the extruder immediately after stopping the screw during a run) could be studied to try to determine the area in which the bubbles were initiated. The results indicated that air entrainment was not the cause of bubble formation and that the bubbles were due to polymer degradation.

Another series of extrusion runs was made, to verify the above observation, using a vacuum hopper or Freon gas in the hopper to exclude air and thus serve to eliminate the bubbles appearing in the polymeric tape. Additionally, a further series of extrusion runs was made wherein the vinylidene chloride polymer was vacuum dried prior to extrusion. None of the above procedures served to eliminate or significantly reduce the presence of bubbles in the extruded polymer tape.

Another series of extrusion runs was then completed as described above, using an extruder screw speed of about 20 RPM; wherein the vinylidene chloride polymer was blended (by conventional mixing means prior to extrusion) with one of a series of conventional plasticizer and/or stabilizer materials. The following Table I lists the amounts and types of additives used and the effect upon bubble formation in the film extrudate.

TABLE I

| Sample No. | Additive Type | % by Wt. | Extrusion Rate (Lbs./Hr.) | Tape Appearance |
|---|---|---|---|---|
| Series I (For Comparison) | (1) | | | |
| 1 | A | 1 | 98 | Bubbles |
| 2 | B | 5 | 124 | " |
| 3 | C | 4 | 95 | " |
| 4 | D | 1 | 156 | " |
| 5 | E | 1 | 118 | " |
| 6 | F | 1 | 107 | " |

TABLE I—Continued

| Sample No. | Additive Type | % by Wt. | Extrusion Rate (Lbs./Hr.) | Tape Appearance |
|---|---|---|---|---|
| 7 | A<br>G | 1<br>1 | 118 | " |
| 8 | H | 5 | 125 | " |
| 9 | I | 5 | 120 | " |
| 10 | J | 5 | 112 | " |
| 11 | K | 1 | (Foamed when heated to extrusion temperatures) | " |
| 12 | L | 0.4 | " | " |
| 13 | M | 0.4 | " | " |
| 14 | N | 0.4 | " | " |
| Series II (The Invention) | | | | |
| 15 | O | 0.25 | 127 | No Bubbles |
| 16 | O | 0.40 | 123 | " |
| 17 | O | 1.0 | 130 | " |
| 18 | O<br>P | 0.25<br>0.40 | 108 | " |

(1)A — Paraplex G-60 (an epoxidized soybean oil)
B — Polycaprolactone (PCL 700)
C — Acryloid K-175 (thermoplastic acrylic polymer)
D — DER 332 (epoxy resin)
E — DER 661 (epoxy resin)
F — DER 664 (epoxy resin)
G — Tetrasodium pyrophosphate
H — Elvax 40 (ethylene-vinyl acetate copolymer)
I — Elvax 150 (ethylene-vinyl acetate copolymer)
J — UE-639 (ethylene-vinyl acetate copolymer)
K — Zinc oxide (particle size, 1–10 microns)
L — Barium oxide (particle size, 1–10 microns)
M — Calcium oxide (particle size, 1–10 microns)
N — Aluminum oxide (particle size, 1–10 microns)
O — Magnesium oxide (particle size, 0.1 micron)
P — Acetyl tributyl citrate (Citraflex A-4)

The above data illustrate that the presence of the prescribed magnesium oxide in the vinylidene chloride polymer, eliminated the presence of undesirable foam and bubbles formed during the preparation of the film material. Sample No. 18 of Table I further illustrates that small amounts of conventional plasticizers may be present in combination with magnesium oxide and still provide bubble-free film. The presence of such plasticizers tends, however, to adversely affect the barrier properties of film produced from such formulations.

The following Table II sets forth oxygen transmission rates (OTR) and water vapor transmission rates (WVTR), determined as per ASTM Test No. D 1434–66, as obtained from vinylidene chloride polymer films formulated as per the referred to Example 1 for individual vinylidene chloride polymer layers (Saran) wherein such layers were present as an intermediate layer in individual multilayer coextruded film structures having opposed polyethylene skin layers adhered to the vinylidene chloride polymer film by means of ethylene-vinyl acetate glue layers.

TABLE II

| Sample No. | Additive Type | Saran Film Thickness Gauge (Mil) | OTR/Mil of Saran Layer | WVTR/Mil of Saran Layer |
|---|---|---|---|---|
| (From Table I) Series I (For Comparison) | | | | |
| | None | .35 | 0.06 | 0.04 |
| 1 | A | .38 | 0.11 | 0.06 |
| 4 | D | .42 | 0.16 | 0.08 |
| Series II (The Invention) | | | | |
| 15 | O | .40 | 0.9 | 0.04 |

The above data illustrate that utilization of magnesium oxide in the vinylidene chloride polymer compositions provides only slight increase in oxygen or water transmission rates.

EXAMPLE 2

Additional experimentation was undertaken to optimize the procedure for adding the herein prescribed magnesium oxide (with or without other modifiers) to the vinylidene chloride copolymer, as disclosed in Example 1, to obtain polymeric film material of optimum clarity and continuity.

As a first procedure, a concentrate was prepared in a Henchel Blendor, said composition consisting of a vinylidene chloride copolymer, as described herein, and magnesium oxide wherein the magnesium oxide was present in an amount of about 10 percent by weight of the vinylidene chloride polymer. It was found, however, that the megnesium oxide would build up on the leading edges of the blades of the blendor and drop off in chunks after the blend cycle was complete.

A second procedure was utilized comprising preparation of a blend of pellets of an ethylene-vinyl acetate copolymer (Elvax 150) with 4 percent by copolymer weight of magnesium oxide. This blend was then admixed with the vinylidene chloride copolymer resin. It was found, however, that significant amounts of the magnesium oxide held fast to the concave surfaces of some of the copolymer pellets, forming tightly packed agglomerates of metal oxide which failed to disperse well in the melt in the extruder, and which resulted in the formation of holes in the film extrudate.

Yet another procedure was utilized comprising preparation of individual blends of the ethylene-vinyl acetate copolymer with magnesium oxide present in amounts of 4 percent and 8 percent by copolymer weight respectively, wherein the ingredients were blended using a conventional high shear Banbury mixer. Upon addition of such blend to the vinylidene chloride polymer and extrusion thereof, it was found that the extrudate was free from bubbles, but was characterized by the presence of noticeable white specks therein.

In a further attempt to overcome the deficiencies of the above procedures, a method of feeding the magnesium oxide powder into the vinylidene chloride copolymer while such copolymer was in motion (prior to extrusion thereof) was devised. This method comprised transporting dry magnesium oxide powder from a container, by means of flexible tubing, to a position underneath the surface of dry vinylidene chloride copolymer particles while such polymeric particles were in motion in a ribbon or cone blender. Using this method, the magnesium oxide particles were finely divided and coated the vinylidene chloride copolymer particles before any contact with metal. This is critical as the metal oxide particles are extremely light and are attracted to metal surfaces to which they cling tenaciously, with resultant formation of agglomerates in the melt and resultant holes in the film extrudate. Optimum results were then obtained by passing the blend, prior to extrusion thereof, through a 28 to 32 mesh screen to remove any particles having a diameter in excess of about 500 microns, followed by addition of the ethylene-vinyl acetate copolymer modifier, at the extruder. This method not only produced film extrudate which was free of bubbles, holes or white specks, but which was also of improved color and exhibited excellent barrier properties.

EXAMPLE 4

In each of several experiments, multilayer coextruded film structures were prepared consisting of a vinylidene chloride polymer (as disclosed in Example 1) forming an intermediate layer which was adhered to polyethylene skin layers by means of ethylene-vinyl acetate glue layers. In a first series of experiments, the vinylidene chloride polymer was formulated with 4.5 percent by weight of the plasticizer, acetyl tributyl citrate (Citraflex A-4).

Oxygen transmission rates of such structures were determined as per ASTM Test No. D-1434-66, as being about 0.55 cc./mil of vinylidene chloride polymer layer thickness.

By way of comparison, oxygen transmission rates of equivalent structures but wherein the vinylidene chloride polymer was nonplasticized and contained 0.4 percent by weight of magnesium oxide (added as per the preferred method set forth in Example 3) were determined as being about 0.145 cc./mil of vinylidene chloride polymer layer thickness. These data further illustrate the excellent oxygen transmission rates obtained when using films prepared from the plasticizer-free compositions of the present invention.

What is claimed is:

1. An improved process for preparing extruded vinylidene chloride polymer film containing modifying amounts of an ethylene-vinyl acetate copolymer, said film being substantially free from bubbles, holes and white specks which process comprises
   1. preparing a blend of (a) a dry, powdered, nonplasticized normally crystalline vinylidene chloride polymer containiing from about 70 to about 95 percent by weight of vinylidene chloride interpolymerized with from about 30 to about 5 percent by weight of at least one monoethylenically unsaturated monomer copolymerizable with vinylidene chloride, with (b) from about 0.05 to about 1 percent based on polymer weight of magnesium oxide having an average particle size of less than about 0.5 micron and wherein said blend is prepared by introducing said magnesium oxide beneath the surface of the mass of dry vinylidene chloride polymer particles while said particles are maintained in motion and where said magnesium oxide coats said particles prior to contact of said magnesium oxide with a metal surface,
   2. removing from said blend any agglomerate having a diameter in excess of about 500 microns, then
   3. admixing said blend with said ethylene-vinyl acetate copolymer in an extruder which is used to thermally fabricate the admixture into film form.

2. The process of claim 1 wherein said normally crystalline vinylidene chloride polymer is a copolymer of vinylidene chloride and vinyl chloride.

3. The process of claim 2 wherein said polymer is a copolymer of about 85 percent by weight vinylidene chloride and 15 percent by weight vinyl chloride.

* * * * *